Figure 1:
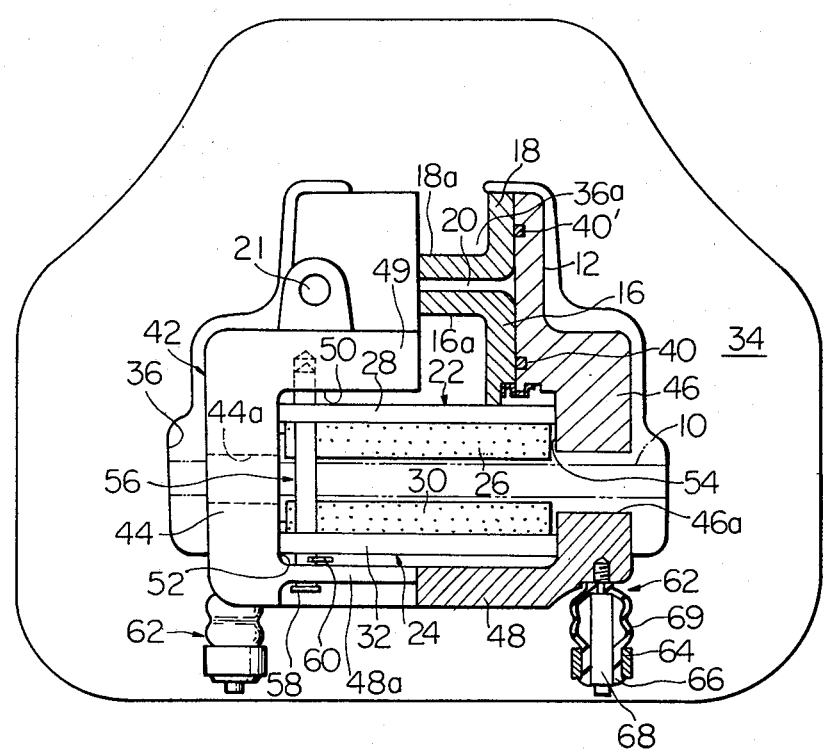

United States Patent [19]

Shimizu et al.

[11] 3,973,652
[45] Aug. 10, 1976

[54] CLOSED LOOP TYPE DISC BRAKE

[75] Inventors: Kazuaki Shimizu, Yokohama; Shunichi Toshida, Tokyo, both of Japan

[73] Assignee: Nissan Motor Co., Ltd., Yokohama, Japan

[22] Filed: Jan. 29, 1975

[21] Appl. No.: 545,225

Related U.S. Application Data

[63] Continuation of Ser. No. 396,175, Sept. 11, 1973, abandoned.

[30] Foreign Application Priority Data

Sept. 12, 1972 Japan.................... 47-106218[U]

[52] U.S. Cl. ............................................ 188/73.4
[51] Int. Cl.$^2$....................................... F16D 65/02
[58] Field of Search............... 188/72.4, 72.5, 73.3, 188/73.4

[56] References Cited

UNITED STATES PATENTS

| | | | |
|---|---|---|---|
| 3,658,160 | 4/1972 | Beller et al. ...................... | 188/73.4 |
| 3,692,151 | 9/1972 | Kobayashi et al. ................ | 188/73.4 |
| 3,712,422 | 1/1973 | Haraikawa et al................. | 188/73.4 |
| 3,719,257 | 3/1973 | Maurice............................. | 188/73.4 |
| 3,844,384 | 10/1974 | Toshida et al. .................... | 188/73.4 |

*Primary Examiner*—Trygve M. Blix
*Assistant Examiner*—Edward R. Kazenske

[57] ABSTRACT

A disc brake comprises a yoke which transmits the force developed by the piston to the indirectly actuated friction pad of the brake. The yoke has an indirectly actuated friction pad contacting bent edge which is arc-shaped and which bears along the edge thereof on the indirectly acuated friction pad so as to cause the contacting bent edge to firmly urge the indirectly actuated friction pad into a braking function during brake application.

3 Claims, 2 Drawing Figures

U.S. Patent Aug. 10, 1976 3,973,652

CLOSED LOOP TYPE DISC BRAKE

This is a continuation of application Ser. No. 396,175, filed Sept. 11, 1973, now abandoned.

This invention relates to a disc brake for a vehicle, and more particularly to a disc brake having a single hydraulic cylinder which actuates two friction pad assemblies.

Conventional disc brakes commonly employed in vehicle usually include a stationary hydraulic cylinder in which two opposed pistons are axially slidably disposed, and a pair of friction pad assemblies, one of which is disposed between the hydraulic cylinder and the adjacent face of a braking disc, and the other being positioned adjacent to the opposite face of the braking disc. The two pistons are respectively associated with the two friction pad assemblies in such a manner that one piston is in abutting engagement with one friction pad assembly to directly move the assembly toward the braking disc, and the other piston engages with a movable member such as a yoke through which the indirectly actuated friction pad assembly is moved toward the braking disc. The yoke has an edge extending parallel to the plane of the braking disc and bearing against one side of the indirectly actuated friction pad assemblies. The edge of the yoke bearing against the adjacent pad assembly is usually formed in an elongated rectangular shape, so that if the yoke engages with the adjacent brake friction pad assembly radially inward or outward of a suitable position, uneven wear of the friction pads result, with one of the edges of each of the friction pads wearing at a rate greater than the other edge. For this reason, it is required that during manufacture of a brake disc, close attention be paid to determine the suitable position of the yoke with respect to the indirectly actuated friction pad assembly.

It is, therefore, an object of the present invention to provide an improved disc brake which overcomes the shortcoming mentioned hereinabove.

Another object of the present invention is to provide an improved disc brake for use in a vehicle in which a yoke is arranged to move a friction pad assembly in a plane perpendicular to the plane of braking disc whereby even wear of the friction pads is obtained.

Still another object of the present invention is to provide an improved disc brake which is simple in construction and economical to manufacture.

Figure 2:
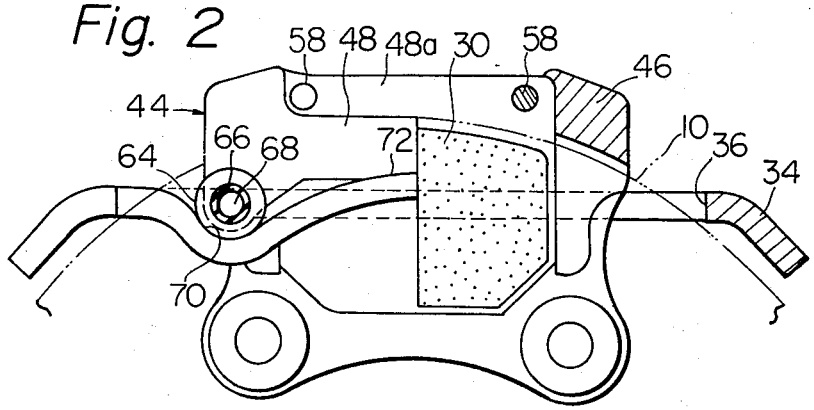

These and other objects and advantages of the present invention will become more apparent from the following description when taken in conjunction with the accompanying drawings, in which:

FIG. 1 is a view illustrating in section in the right half and in plan in the left half one preferred embodiment of a disc brake according to the present invention; and FIG. 2 is a side view, partly in section, of a portion of the disc brake shown in FIG. 1.

Referring now to FIGS. 1 and 2, there is shown a preferred embodiment of a disc brake according to the present invention. As shown, the disc brake includes a rotatable braking disc 10 which is mounted for rotation with a wheel (not shown) of the motor vehicle. Adjacent to a face of the breaking disc 10 is disposed a stationary hydraulic cylinder 12 which is rigidly fixed to a frame or other structural part of the motor vehicle through suitable fastening means, though not shown. The stationary hydraulic cylinder 12 is open at both ends and positioned to have the axis movement of its inner and outer pistons 16 and 18 respectively substantially parallel to the axis of the disc 10. The pistons 16 and 18 have inner walls 16a and 18a, respectively, and define a fluid chamber 20 therebetween. The fluid chamber 20 communicates through a bore 21 with a master cylinder (not shown) so that fluid under pressure is supplied thereinto when a brake pedal is depressed, whereby the pistons 16 and 18 are urged apart from each other.

Directly and indirectly actuated friction pad assemblies 22 and 24 are positioned adjacent to the faces of the disc 10. The directly actuated friction pad assembly 22 is interposed between the braking disc 10 and the inner piston 16, and comprises a friction pad 26 and a backing plate 28 to which the friction pad 26 is bonded or otherwise secured. The inner piston 16 is thus in abutting engagement with the inner face of the braking plate 28. The indirectly actuated friction pad assembly 24 is positioned adjacent to the opposite side of the disc 10 and comprises a friction pad 30 and a backing plate 32 secured thereto. The backing plates 28 and 32 may preferably have larger areas than the respective friction pads 26 and 30.

The stationary hydraulic cylinder 12 and the friction pad assemblies 22 and 24 are housed in a yoke 34 which is formed from a flat plate. The yoke 34 has a suitably shaped opening 36 which accommodates an arc of the braking disc 10 and which has a projection 36a which bears against the inner wall 18a of the outer piston 18. Sealing rings 40 and 40' are mounted between the hydraulic cylinder 12 and the respective pistons 16 and 18.

In FIG. 1, the stationary hydraulic cylinder 12 is shown to have a torque absorbing carrier 42 which comprises a pair of leg portions 44 and 46 which are integrally formed with the stationary hydraulic cylinder 12, and extend parallel to the axis of the disc 10. The leg portions 44 and 46 are respectively provided with recesses 44a and 46a to accommodate an arc of the disc 10. These leg portions 44 and 46 are connected to each other at their ends by means of cross members 48 and 49 integrally formed therewith.

As shown in FIGS. 1 and 2, the torque absorbing structure 42 is provided with an opening 50 which is defined by the leg portions 44 and 46 and the cross members 48 and 49, and which receives therein the directly and indirectly actuated friction pad assemblies 22 and 24. This opening 50 provides easy access to the friction pad assemblies 22 and 24, facilitating inspection and replacement thereof. Provision of such an opening will also prove advantageous to dissipate frictional heat produced by the disc 10 and friction pads 26 and 30.

The opening 50 has two opposite edges 52 and 54 for abutting engagement with the ends of the directly and indirectly actuated friction pad assemblies 22 and 24, so that the friction pad assemblies 22 and 24 are guided thereby toward and away from the disc 10. Also, the braking torque exerted on the friction pad assemblies 22 and 24 is transferred through the leg portions 44 and 46 to the stationary hydraulic cylinder 12 and the vehicle frame.

A pair of guide pins 56 pass through holes (not shown) formed through the friction pad assemblies 22 and 24, and each pin 56 has one end fitted into a blind bore (no numeral) formed in the cross member 49. The pins 56 pass through holes (no numerals) formed in a flange portion 48a of the cross member 48. Each pin 56 has a head 58 and a clip 60 to prevent movement thereof.

As shown in FIG. 1, the disc brake also has a pair of guide means 62 to guide the yoke 34 in a direction substantially perpendicular to the plane of rotation of the disc 10 to produce smooth engagement of the disc brake. Each of the guide means 62 includes an annular support 64 which is fixed to the yoke 34 in a suitable manner such as by welding, a bushing 66 which may be made of an elastic material such as rubber and which is disposed in a bore (not identified) of the support 64, and a guide pin 68 which is slidably received in the bushing 66. The guide pins 68 extend in parallel to the direction of movement of the friction pad assemblies 22 and 24 and are rigidly connected to the cross member 48. With this arrangement, the yoke 34 is permitted to move in a direction substantially perpendicular to the plane of the disc 10 whereby braking performance and efficiency are increased and uneven wear of the brake linings 26 and 30 is prevented. Indicated as 69 is dust seal disposed about the pin 68.

In accordance with an important feature of the present invention, the yoke 34 is provided with a pair of corrugations 70 and an indirectly actuated friction pad contacting section 72 which is upwardly bent as well shown in FIG. 2. The corrugations 70 are formed at both sides of the pad contacting section 72, only one of which is shown in FIG. 2. The support 64 of each guide means 62 is firmly fixed to a hollow section of each corrugations 70. It is now to be noted that the indirectly actuated friction pad contacting section 72 is bent so that it is arc-shaped in sections taken along planes parallel to the plane of the backing plate 32 of the indirectly actuated friction pad assembly 24 and the edge of this section facing this backing plate is in a plane parallel thereto. Thus during brake application this edge is pressed into firm relationship against the backing plate along its entire length, i.e. along the length of the arc. The engaging section 72 bears directly on the backing plate 32 to press the friction pad 30 uniformly against the disc 10 during brake engagement.

When the brake pedal is depressed and fluid under pressure is supplied from the master cylinder into the fluid chamber 20 the pistons 16 and 18 are moved apart by means of the fluid pressure. The inner piston 16 pressed on the backing plate 28 of the directly actuated friction pad assembly 22, forcing the friction pad 26 against the disc 10. The outer piston 18 is moved away from the inner piston 16 and bears on the projection 36a of the yoke 34. The yoke 34 is accordingly moved in the direction of movement of the outer piston 18 with the result that the indirectly actuated friction pad assembly 24 is pressed against the disc 10. The disc 10 is in this manner powerfully clamped between the two friction pads 26 and 30, to decelerate the vehicle.

When the friction pad assemblies 22 and 24 are forced against the faces of the disc 10 during braking action, they are subjected to braking torque from the disc 10, and as a result, the backing plates 28 and 32 are forced against (for example) the side edge 52 of the opening 50.

This torque is thus transmitted through the leg portions 44 and 46 to the stationary hydraulic cylinder 12 and vehicle frame, while the yoke 34 is unaffected by the torque at all times. The yoke 34 is in this manner designed to only receive force due to movement of the outer piston 18 causing the friction pad 30 to press against the disc 10.

It should be understood that since the engaging section 72 is arc-shaped, it presses the friction pad 30 uniformly against the disc 10, and due to the arrangement of the guide means 62, the friction pad 30 always wears evenly because it contacts the disc 10 in a substantially parallel manner.

It should also be appreciated that since the corrugations 70 are formed on the engaging section 72 to accommodate the guide means 62, the thickness of the disc brake can be reduced and it can be installed on a vehicle within a small space without interfering with other component parts of the vehicle such as a road wheel tire rim.

IMAGE SYSTEM TEST TARGET
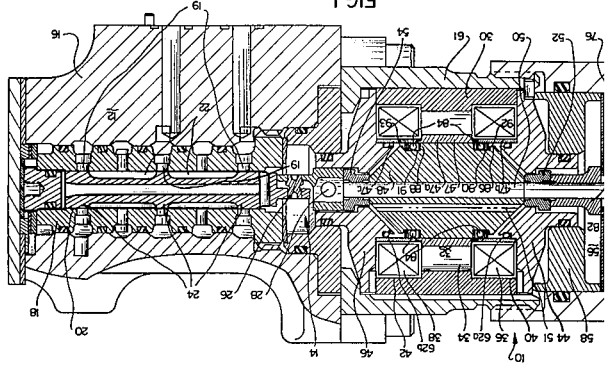
FIG.1
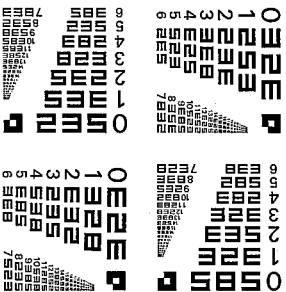

What is claimed is:

1. In a disc brake for wheeled vehicle, including a rotatable braking disc, a stationary hydraulic cylinder having inner and outer pistons slidable in opposite directions which are substantially parallel to the axis of said braking disc, said pistons defining a fluid chamber therebetween into which pressurized fluid is supplied when a braking action is initiated, directly and indirectly actuated friction pad assemblies adjacent to opposite faces of said braking disc, said directly actuated friction pad assembly being in abutting engagement with said inner piston and thereby forced against said braking disc when said inner piston is moved by said pressurized fluid, and a yoke movable in a direction parallel to said axis of said braking disc by said outer piston to move said indirectly actuated friction pad assembly, the improvement in that said yoke has a pad contacting edge which contacts the surface of the backing plate of said indirectly actuated friction pad assembly, said contacting edge being bent so that the edge thereof in contact with the surface of the backing plate of the pad is arc-shaped and contacting said backing plate along the entire length thereof so that said indirectly actuated friction pad assembly is reliably urged into a braking function.

2. In a disc brake for wheeled vehicle, including a rotatable braking disc, a stationary hydraulic cylinder having inner and outer pistons slidable in opposite directions which are substantially parallel to the axis of said braking disc, said pistons defining a fluid chamber therebetween into which pressurized fluid is supplied when a braking action is initiated, directly and indirectly actuated friction pad assemblies adjacent to opposite faces of said braking disc, said directly actuated friction pad assembly being in abutting engagement with said inner piston and thereby forced against said braking disc when said inner piston is moved by said pressurized fluid, a yoke movable in a direction parallel to said axis of said braking disc by said outer piston to move said indirectly actuated friction pad assembly, and two guide means provided between said stationary hydraulic cylinder and said yoke for guiding said yoke in a direction substantially parallel to said axis of said braking disc, the improvement in that said yoke has a pad contacting edge which is bent so that the edge thereof in contact with the surface of the backing plate of the indirectly actuated friction pad is arc-shaped in section in a plane parallel to the pad and which contacts the surface of the backing plate of said indirectly actuated friction pad assembly along its entire length for causing said pad contacting bent edge to firmly urge said indirectly actuated friction pad assembly into a braking function, further said yoke has a pair